(12) United States Patent
Kato

(10) Patent No.: US 7,676,944 B2
(45) Date of Patent: Mar. 16, 2010

(54) SHAPE INSPECTION DEVICE FOR CURVED HOSE

(75) Inventor: Kazuhiro Kato, Komaki (JP)

(73) Assignee: Tokai Rubber Industries, Ltd. (JP)

( * ) Notice: Subject to any disclaimer, the term of this patent is extended or adjusted under 35 U.S.C. 154(b) by 143 days.

(21) Appl. No.: 11/965,893

(22) Filed: Dec. 28, 2007

(65) Prior Publication Data

US 2008/0201974 A1    Aug. 28, 2008

(30) Foreign Application Priority Data

Feb. 23, 2007    (JP) .............................. 2007-044765

(51) Int. Cl.
*G01B 5/20* (2006.01)
(52) U.S. Cl. .......................................... 33/551; 33/529
(58) Field of Classification Search ................. 33/545, 33/549, 551, 552, 555, 562, 573, 1 G, 529, 33/533; 269/309, 311
See application file for complete search history.

(56) References Cited

U.S. PATENT DOCUMENTS

| | | | |
|---|---|---|---|
| 2,713,725 A * | 7/1955 | Goldsmith | 33/552 |
| 4,593,476 A * | 6/1986 | Clark et al. | 33/529 |
| 4,689,891 A * | 9/1987 | Clark | 33/529 |
| 5,208,995 A * | 5/1993 | McKendrick | 33/567 |
| 5,400,517 A * | 3/1995 | McKendrick | 33/573 |
| 5,412,877 A * | 5/1995 | McKendrick | 33/567 |
| 6,029,333 A * | 2/2000 | Sapienza, IV | 33/566 |
| 7,024,952 B2 * | 4/2006 | Huynh et al. | 73/865.8 |
| 7,243,438 B2 * | 7/2007 | Jaubert | 33/551 |

FOREIGN PATENT DOCUMENTS

| | | | |
|---|---|---|---|
| DE | 10234095 A1 * | 2/2004 | |
| FR | 2859524 A1 * | 3/2005 | |
| GB | 1505258 A * | 3/1978 | |
| JP | 58068601 A3 * | 4/1983 | |
| JP | 61-11204 | 1/1986 | |
| JP | 10-122443 | 5/1998 | |

\* cited by examiner

*Primary Examiner*—R. Alexander Smith
(74) *Attorney, Agent, or Firm*—Andrus, Sceales, Starke & Sawall, LLP

(57) ABSTRACT

A shape inspection device is adapted for a curved resin hose having a hose body including a bent portion. The shape inspection device has a first fixing portion for fixing one longitudinal end portion of the curved resin hose, a second fixing portion for fixing the other longitudinal end portion of the curved resin hose, and an inspecting portion between the first and the second fixing portions. The inspecting portion has an inspecting and verifying arrangement along a pathway of the hose body of the curved resin hose as designed. The inspecting and verifying arrangement has verifying members disposed outside the pathway and spaced from the pathway.

6 Claims, 5 Drawing Sheets

SHAPE INSPECTION DEVICE FOR CURVED HOSE

BACKGROUND OF THE INVENTION

1. Field of the Invention

The present invention relates to a shape inspection device for a resin hose that is used for a piping system in a motor vehicle, etc., more specifically, to a shape inspection device capable of inspecting accurately a curving shape or a curvature shape of a curved resin hose having a bent portion or bent portions.

2. Description of the Related Art

For a piping system in a motor vehicle, a resin hose as well as a rubber hose has been used. The rubber hose is excellent in assembling properties and vibration absorbing properties, while the resin hose is light-weight and excellent in handling properties. Also, the resin hose is hard to flex. So, when the resin hose is formed into a shape following a piping layout in advance, the resin hose is installed so as to accurately follow the piping layout. This is an advantage of the resin hose.

By the way, a curved resin hose having a bent portion is formed in a mold that is configured for molding or forming the curved hose of size and shape as designed. However, the curved hose that is formed often does not have a shape as designed since a curving shape or a curvature shape of the curved resin hose is likely deformed or changed when the curved resin hose is removed from the mold. That is, in many cases, the shape of the curved resin hose removed from the mold is not accurately the same as designed. So, it is required to verify whether the curved resin hose has a shape falling within an acceptable range, namely, within a usable range, by inspecting the shape of the curved resin hose that is produced.

In inspection of the shape of the curved resin hose, a produced hose is attached on a shape inspection device one by one. The shape inspection device used here has a fit-in portion that is shaped to conform to or follow the shape of the hose as designed, and the curved resin hose is tried to be fitted in the fit-in portion for inspecting the shape or the curving shape of the curved resin hose. When the curved resin hose is fitted in the fit-in portion, the curved resin hose is found usable. When the curved resin hose cannot be fitted in the fit-in portion, the curved resin hose is found unusable (for example, refer to Patent Documents 1 and 2 although these patents relates to rubber hoses).

| [Patent Document 1] | JP-A-10-122443 |
| [Patent Document 2] | JP-A-61-11204 |

Although a curved resin hose is hard to flex, in fact, the curved resin hose has flexibility or resiliency to some extent. Therefore, even when a curving shape or a curvature shape of the curved resin hose is greatly changed compared to a shape as designed, the curved resin hose could be forcibly pushed into the fit-in portion. So, inspection results obtained with use of such inspection device may be improper or may not be reliable.

Under the foregoing circumstances, it is an object of the present invention to provide a shape inspection device for a curved hose that allows for accurate inspection of a shape or a curving shape of a curved resin hose.

SUMMARY OF THE INVENTION

In order to achieve the foregoing object, there is provided a novel shape inspection device for a curved resin hose in accordance with the present invention. The curved resin hose has a hose body including a bent portion between one longitudinal end portion and the other longitudinal end portion of the curved resin hose. The shape inspection device comprises a first fixing portion for fixing (positioning) said one longitudinal end portion of the curved resin hose, a second fixing portion for fixing (positioning) the other longitudinal end portion of the curved resin hose, and an inspecting portion provided between the first fixing portion and the second fixing portion. The second fixing portion is disposed so as to fix the other longitudinal end portion of the curved resin hose at a position where the other longitudinal end portion should be located when said one longitudinal end portion of the curved resin hose is fixed to the first fixing portion. The inspecting portion comprises an inspecting and verifying arrangement along a pathway through which the hose body of the curved resin hose should pass when said one longitudinal end portion and the other longitudinal end portion of the curved resin hose are fixed to the first and the second fixing portions, respectively. The inspecting and verifying arrangement comprises a verifying member or verifying members disposed outside the pathway for the hose body and spaced from the pathway of the hose body. The second fixing portion is disposed so as to fix the other longitudinal end portion of the curved resin hose at a position where the other longitudinal end portion of the curved hose should be located when said one longitudinal end portion of the curved hose is fixed to the first fixing portion, that is, at a position where when one longitudinal end portion of a standard curved hose or a standard curved resin hose is fixed to the first fixing portion, the other longitudinal end portion of the standard curved hose is located. The standard curved hose has the same size and shape as designed. For example, the standard curved hose is an imaginary one. The inspecting and verifying arrangement is constructed along a pathway through which the hose body of the curved resin hose should pass, namely, along a pathway through which the hose body of the standard curved hose passes. The pathway has a circular cross-section of the same diameter as the hose body of the standard curved hose. The pathway may be also regarded as the hose body itself of the standard curved hose. In other words, the inspecting and verifying arrangement is constructed along a course along which the hose body of the curved resin hose should extend or lie. The inspection and verifying arrangement has a verifying member or verifying members that are disposed outside the pathway for the hose body and spaced from the pathway. Since the verifying member is disposed with a space from the pathway, outside the pathway, namely, the verifying member does not contact the pathway or does not exist within the pathway, the verifying member is not contacted by the curved hose that is the same in size and shape as the standard curved hose. When the verifying member is disposed close to or near the pathway, the verifying member is contacted by the hose body of the curved hose that is greatly deformed compared to the standard curved hose.

The shape inspection device may be adapted, for example, as follows. Said one longitudinal end portion and the other longitudinal end portion of the curved resin hose are fixed to the first and the second fixing portions, respectively, and it is checked or verified whether the hose body contacts the verifying member. When the hose body contacts the verifying member or any of the verifying members, the curved resin hose is found not to have a shape as designed, or the curved resin hose is found to be deformed too greatly or unacceptably.

For simplifying a construction of the device, the shape inspection device may be constructed as follows. The inspection and verifying arrangement has a plurality of verifying members of a lower verifying member under the pathway for the hose body, and side verifying members at widthwise opposite sides of the pathway. The lower verifying member is disposed throughout an entire length or a generally entire length of the pathway, and spaced from the pathway, and the side verifying members are disposed at a plurality of positions along a length of the pathway, and spaced from the pathway, respectively. For example, when the hose body protrudes upwardly with respect to an upper end of the side verifying member, the curved resin hose is found to be deformed too greatly or unacceptably.

For simplifying a shape of the side verifying member, the side verifying members are preferably disposed corresponding to a straight portion or straight-line portion of the pathway.

Another shape inspection device according to the present invention is also adapted for a curved resin hose having a hose body including a bent portion between one longitudinal end portion and the other longitudinal end portion of the curved resin hose. The shape inspection device comprises a first fixing portion for fixing (positioning) said one longitudinal end portion of the curved resin hose, a second fixing portion for fixing (positioning) the other longitudinal end portion of the curved resin hose, and an inspecting portion provided between the first fixing portion and the second fixing portion. The second fixing portion is disposed so as to fix the other longitudinal end portion of the curved resin hose at a position where the other longitudinal end portion should be located when said one longitudinal end portion of the curved resin hose is fixed to the first fixing portion. The inspecting portion comprises an inspecting and verifying arrangement along a standard central line of the hose body when said one longitudinal end portion and the other longitudinal end portion of the curved resin hose are fixed to the first and the second fixing portions, respectively. The inspecting and verifying arrangement may have a verifying member, and the verifying member is spaced from the standard central line by a distance larger than a radius of the curved resin hose. The standard central line is a central line of the standard curved hose. The verifying member is spaced from the standard central line by the distance larger than the radius of the curved resin hose (for example, the standard curved hose). Therefore, the verifying member is not contacted by the curved resin hose that is the same in size and shape as the standard curved hose. When the verifying member is disposed close to or near a position that is spaced from the standard central line by a distance equal to the radius of the curved resin hose, the verifying member is contacted by the hose body of the curved resin hose that is greatly deformed compared to the standard curved hose.

As stated above, in the shape inspection device for a curved resin hose according to the present invention, opposite longitudinal end portions of the curved hose are fixed, and the shape of the curved hose is verified by checking a positional relationship between a hose body and a verifying member. Thereby highly accurate inspection results for the shape of the curved hose can be obtained.

Now, the preferred embodiments of the present invention will be described in detail with reference to the drawings.

DETAILED DESCRIPTIONS OF PREFERRED EMBODIMENTS

Figure 1:
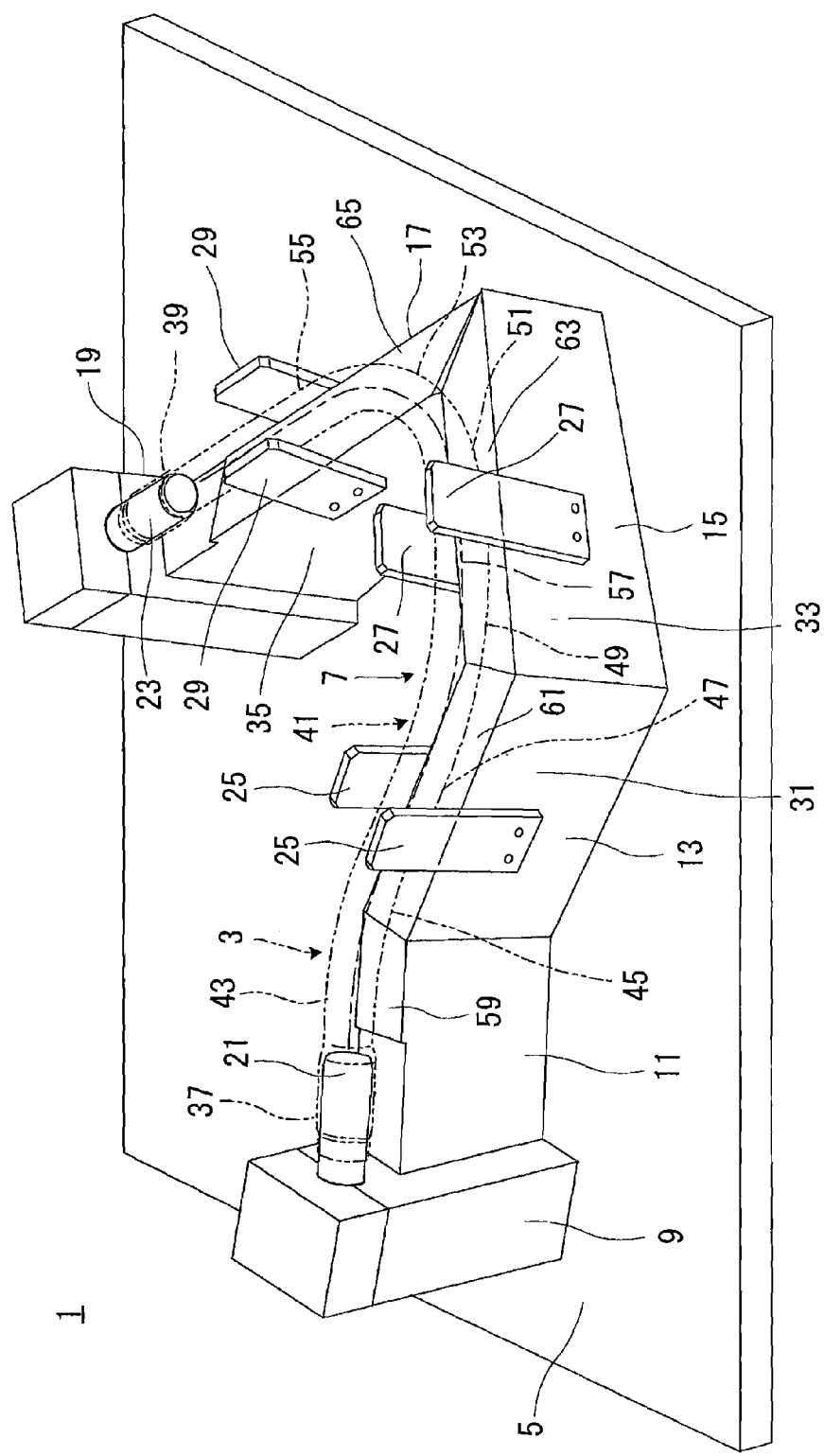
FIG. 1 is a perspective view of an inspection wooden form used as a shape inspection device for a curved resin hose according to the present invention.

With reference to FIG. 1, an inspection wooden form 1 is adapted for inspecting a shape, a curving shape or a curvature of a curved resin hose 3 (refer to FIG. 6) that is used in piping for a fuel system of a motor vehicle. The inspection wooden form 1 has a wooden support plate 5, a wooden form body 7 arranged on the support plate 5. The wooden form body 7 is constructed by disposing wooden form blocks 9, 11, 13, 15, 17, 19 successively so as to extend along a planar shape of the curved resin hose 3 (here, the curved resin hose 3 is a curved resin hose having a shape and a size as designed, namely, a standard curved resin hose or standard curved hose which is indicated in phantom lines in FIG. 1) on the support plate 5. Each of the wooden form blocks 9, 11, 13, 15, 17, 19 is bonded and fixed on the support plate 5. The wooden form blocks 11, 13, 15, 17 form a lower verifying member under an inspecting portion.

A metal fixing pipe 21 (a first fixing portion) projects from the wooden form block 9 disposed on one end portion of the wooden form body 7, while a metal fixing pipe 23 (a second fixing portion) projects from the wooden form block 19 disposed on the other end portion of the wooden form body 7. Pairs of side verification plates 25, 27, 29 (side verifying members) are attached on two wooden form blocks 13, 15 provided on a middle portion of the wooden form body 7 and the wooden form block 17 provided on the other end of the wooden form body 7, respectively. The side verifying or verification plates 25, 27, 29 are transparent and made of resin. Each pair of the side verifying plates 25, 27, 29 are fixed on side surfaces 31, 33, 35 of the wooden form blocks 13, 15, 17, in opposed relation to each other, and protrude upwardly with respect to the wooden form blocks 13, 15, 17. And, the wooden form blocks 11, 13, 15, 17, and the side verifying plates 25, 27, 29 construct the inspecting portion and an inspecting and verifying arrangement.

The curved resin hose 3 integrally comprises one longitudinal end portion 37, the other longitudinal end portion 39, and a hose body 41 between the one longitudinal end portion 37 and the other longitudinal end portion 39. The one longitudinal end portion 37 and the other longitudinal end portion 39 are formed to be tightly fitted on outer peripheries of joint pipes or joint pipe bodies in piping for a fuel system of a motor vehicle. The hose body 41 integrally has a first straight tubular portion 43, a first bent portion 45, a second straight tubular portion 47, a second bent portion 49 bent in an opposite direction of a bending direction of the first bent portion 45, a third straight tubular portion 51, a third bending portion 53 bent in the same direction as a bending direction of the second bent portion 49, and a fourth straight tubular portion 55, sequentially from one longitudinal end toward the other longitudinal end of the hose body 41.

The wooden form blocks 11, 13, 15, 17, 19 are arranged or disposed so as to follow a pathway (refer to reference numerals 41 and 39 in FIG. 1) through which the hose body 41 and the other longitudinal end portion 39 pass when the one longitudinal end portion 37 of the standard curved resin hose 3 is fitted on the fixing pipe 21 of the wooden form block 9, at a predetermined rotational angular position. And, the fixing pipe 23 of the wooden form block 19 is provided at such position that the other longitudinal end portion 39 of the standard curved resin hose 3 is located when the one longitudinal end portion 37 of the standard curved resin hose 3 is fitted on the fixing pipe 21 of the wooden form block 9, at a predetermined rotational angular position. Or, the fixing pipe 23 of the wooden form block 19 is provided so as to have a central axis conforming to a central line (standard central line) 57 of the standard curved resin hose 3 on the other longitudinal end portion 39 thereof when the one longitudinal end portion 37 of the standard curved resin hose 3 is fitted on the fixing pipe 21 of the wooden form block 9, at a predetermined rotational angular position.

Figure 2:
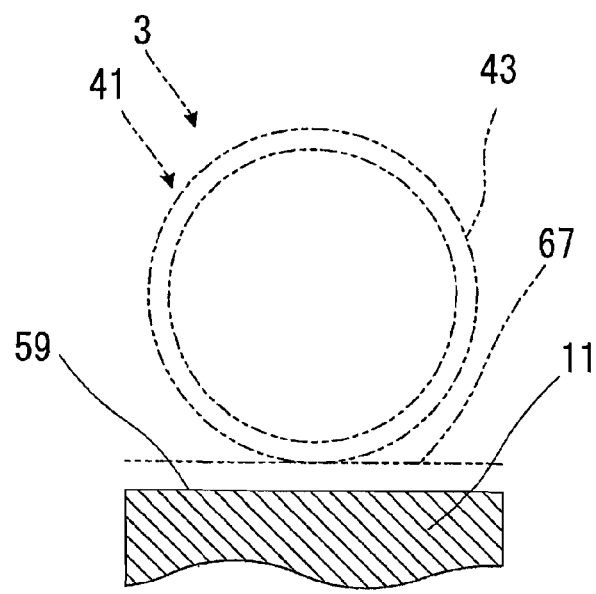
FIG. 2 is a sectional view of a wooden form body at a first position along a longitudinal direction of the wooden form body.
Figure 3:
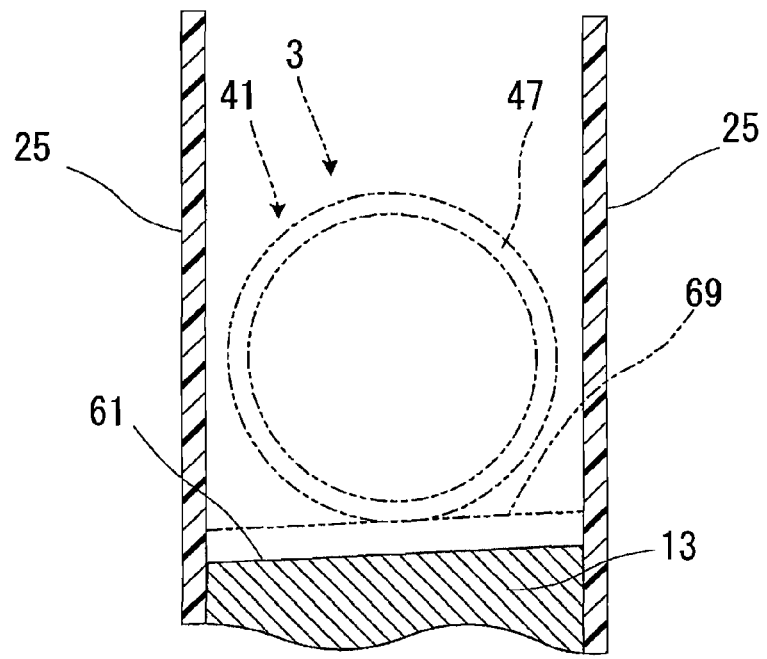
FIG. 3 is a sectional view of the wooden form body at a second position along the longitudinal direction of the wooden form body.
Figure 4:
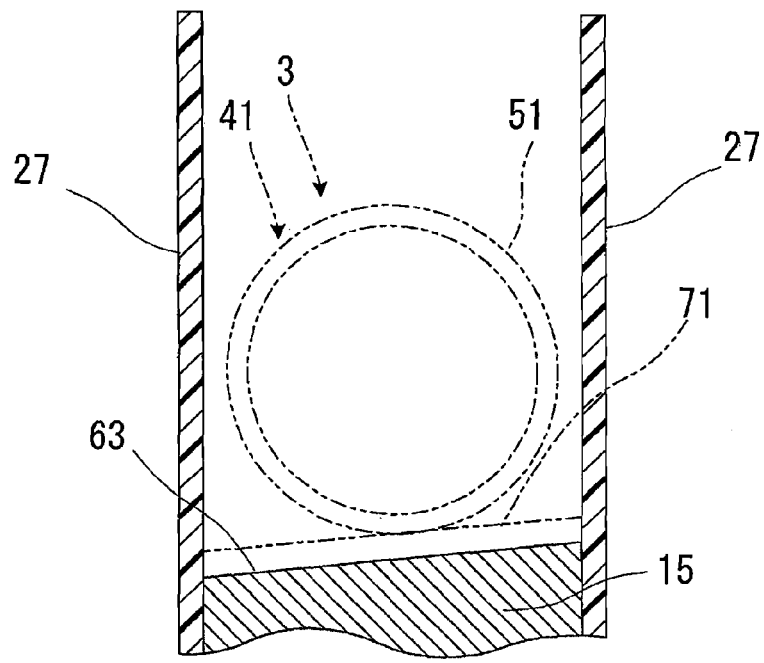
FIG. 4 is a sectional view of the wooden form body at a third position along the longitudinal direction of the wooden form body.
Figure 5:
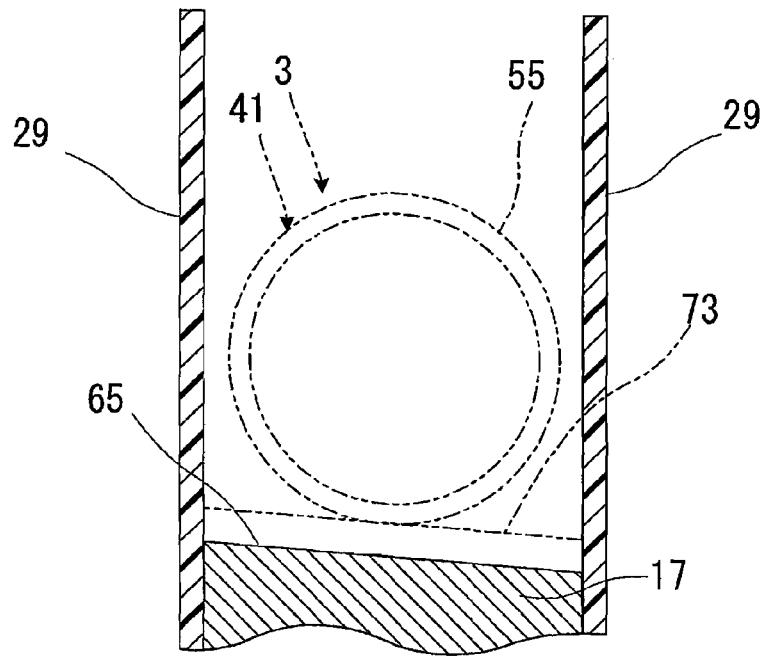
FIG. 5 is a sectional view of the wooden form body at a fourth position along the longitudinal direction of the wooden form body.

Each of upper surfaces 59, 61, 63, 65 of the wooden form blocks 11, 13, 15, 17 is arranged so as to be spaced from the hose body 41 of the standard curved resin hose 3 with the one longitudinal end portion 37 being fitted on the fixing pipe 21 of the wooden form block 9 at the predetermined rotational angular position and the other longitudinal end portion 39 being fitted on the fixing pipe 23 of the wooden form block 19. The upper surface 59 of the wooden form block 11 is arranged so as to extend parallel to and spaced by a predetermined distance from an imaginary plane 67 tangent to a lower end or bottom of the first straight tubular portion 43 of the hose body 41 (the first straight tubular portion 43 of the standard curved resin hose 3) (refer to FIG. 2). The upper surface 61 of the wooden form block 13 extends parallel to and spaced by a predetermined distance from an imaginary plane 69 tangent to a portion of the second straight tubular portion 47 (the second straight tubular portion 47 of the standard curved resin hose 3) displaced in a counterclockwise direction by a predetermined angle from a lower end or bottom thereof, as seen from one end (refer to FIG. 3). Meanwhile, the upper surface 59 of the wooden form block 11 is formed with a recess in one end thereof. And, the upper surface 63 of the wooden form block 15 extends parallel to and spaced by a predetermined distance from an imaginary plane 71 tangent to a portion of the third straight tubular portion 51 (the third straight tubular portion 51 of the standard curved resin hose 3) displaced in the counterclockwise direction by a predetermined angle from a lower end or bottom thereof, as seen from one end (refer to FIG. 4). Moreover, the upper surface 65 of the wooden form block 17 extends parallel to and spaced by a predetermined distance from an imaginary plane 73 tangent to a portion of the fourth straight tubular portion 55 (the fourth straight tubular portion 55 of the standard curved resin hose 3) displaced in a clockwise direction by a predetermined angle from a lower end or bottom thereof, as seen from one end (refer to FIG. 5). Meanwhile, the upper surface 65 of the wooden form block 17 is formed with a recess in the other end thereof. The distance between the upper surface 59 of the wooden form block 11 and the imaginary plane 67, the distance between the upper surface 61 of the wooden form block 13 and the imaginary plane 69, the distance between the upper surface 63 of the wooden form block 15 and the imaginary plane 71, and the distance between the upper surface 65 of the wooden form block 17 and the imaginary plane 73 may be designed the same or different. Further, the one end portion of the upper surface 61 of the wooden from block 13 is adjusted, for example, such that one end edge of the upper surface 61 extends in a horizontal direction. As such, each of end portions of the upper surfaces 59, 61, 63, 65 of the wooden form blocks 11, 13, 15, 17 is sometimes adjusted relative to slope angle, etc.

The pair of the side verifying plates 25 are disposed such that the second straight tubular portion 47 (the second straight tubular portion 47 of the standard curved resin hose 3) is interposed therebetween with a predetermined space between the second straight tubular portion 47 and each of the side verifying plates 25, and upper ends of the side verifying plates 25 extend upwardly with respect to or beyond an upper end of the second straight tubular portion 47. The pair of the side verifying plates 27 are disposed such that the third straight tubular portion 51 (the third straight tubular portion 51 of the standard curved resin hose 3) is interposed therebetween with a predetermined space between the third straight tubular portion 51 and each of the side verifying plates 27, and upper ends of the side verifying plates 27 extend upwardly with respect to or beyond an upper end of the third straight tubular portion 51. Further, the pair of the side verifying plates 29 are disposed such that the fourth straight tubular portion 55 (the fourth straight tubular portion 55 of the standard curved resin hose 3) is interposed therebetween with a predetermined space between the fourth straight tubular portion 55 and each of the side verifying plates 29, and upper ends of the side verifying plates 29 extend upwardly with respect to or beyond an upper end of the fourth straight tubular portion 55.

Figure 6:
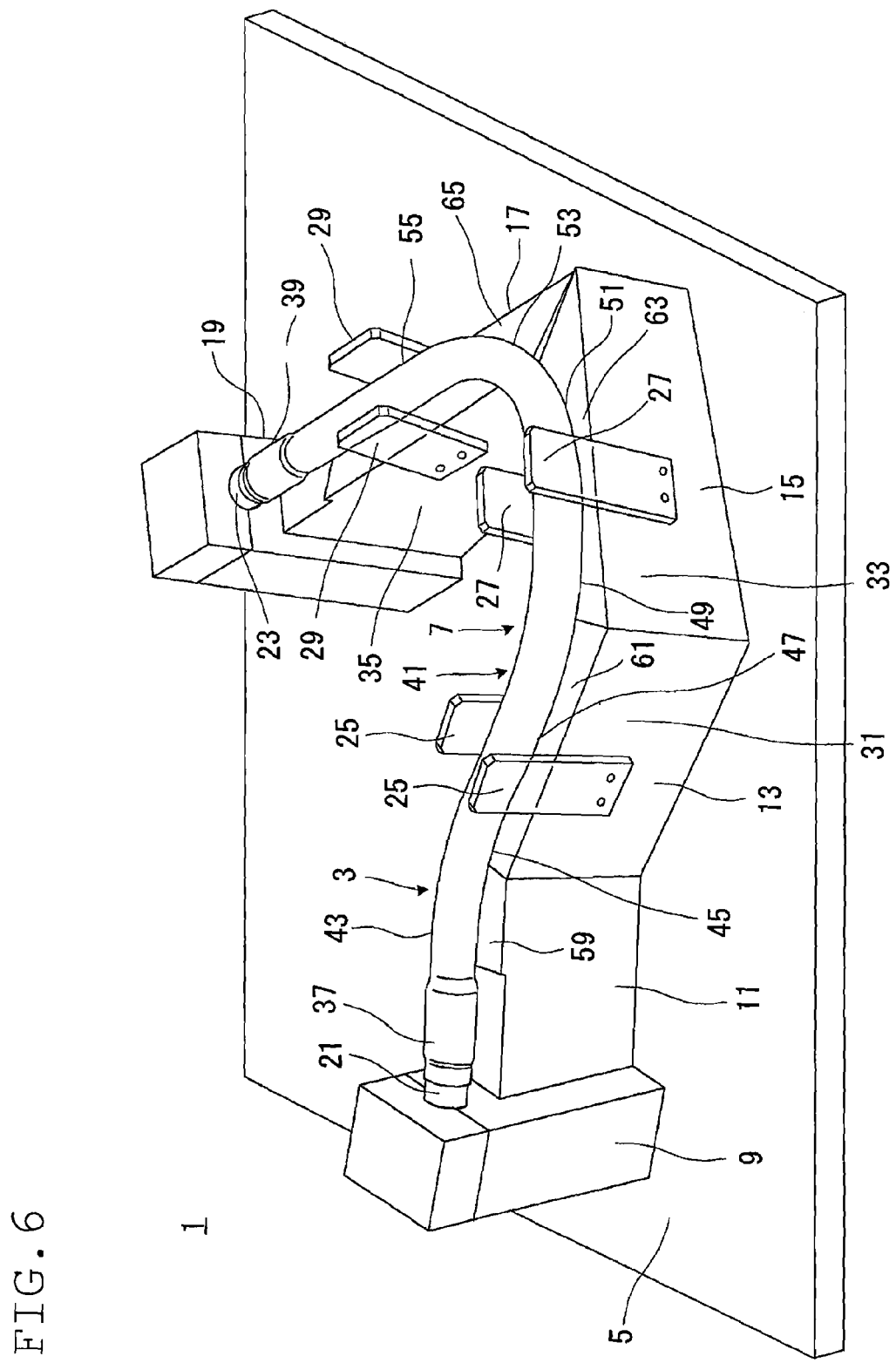
FIG. 6 is a perspective view of the inspection wooden form in which the curved resin hose is attached.

As understood from FIG. 6, for inspecting a shape, a curving shape or curvature shape of a finished curved resin hose 3 (a product curved resin hose 3), the product curved resin hose 3 is attached on the inspection wooden form 1 as follows. The one longitudinal end portion 37 of the product curved resin hose 3 is fitted on the fixing pipe 21, the hose body 41 is placed between the side verifying plates 25, 27, 29, from above and the other longitudinal end portion 39 is fitted on the fixing pipe 23. Since each of the fixing pipes 21, 23 has a diameter slightly smaller than a pipe or pipe body for piping, the one longitudinal end portion 37 and the other longitudinal end portion 39 are fitted on the fixing pipes 21, 23 rotatably with respect to the fixing pipes 21, 23, respectively.

Figure 7:
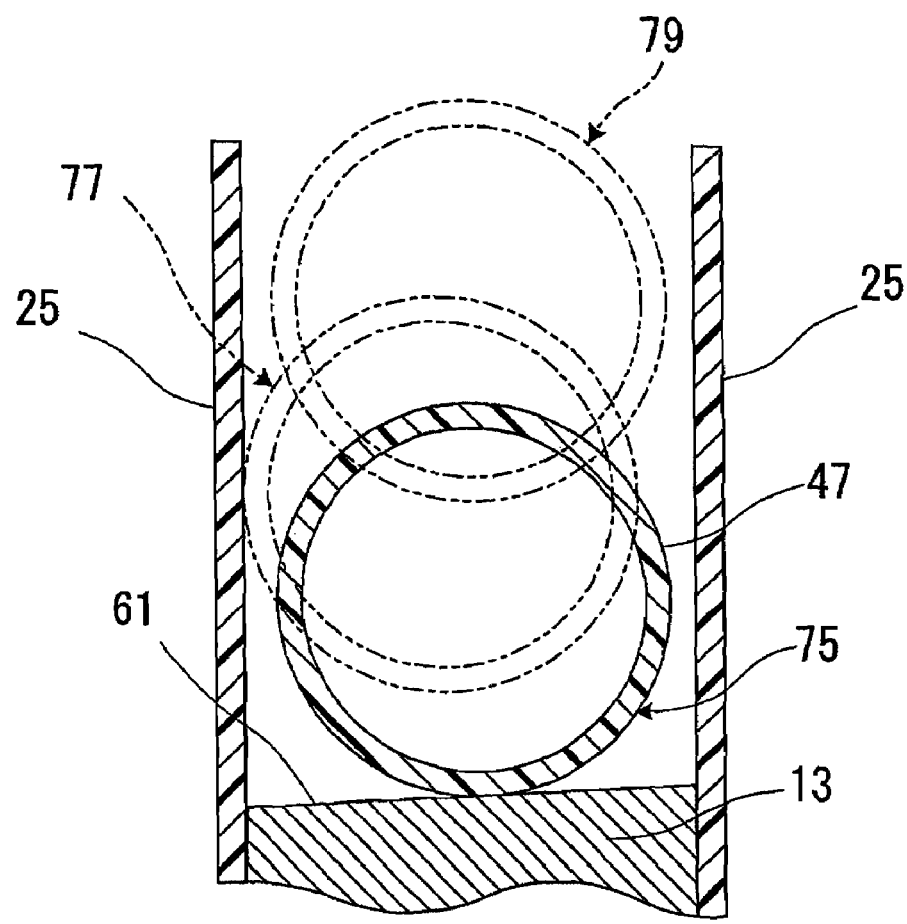
FIG. 7 is a view for explaining a case that the curved resin hose is found to be changed greatly in shape.

Then, it is checked whether the product curved resin hose 3 contacts the upper surfaces 59, 61, 63, 65 of the wooden form blocks 11, 13, 15, 17, respectively, whether the product curved resin hose 3 contacts the side verifying plates 25, 27, 29, respectively, and whether the upper end of the product curved resin hose 3 is not beyond upper ends of the side verifying plates 25, 27, 29, respectively. When the product curved resin hose 3 does not contact any of the upper surfaces 59, 61, 63, 65 and any of the side verifying plates 25, 27, 29, and the upper end of the product curved resin hose 3 is not beyond any of the upper ends of the side verifying plates 25, 27, 29, the product curved resin hose 3 can be estimated to have a correct size and shape. However, for example, as shown in FIG. 7, when the product curved resin hose 3 contacts the upper surface 61 of the wooden form block 13 (refer to reference numeral 75) or the side verifying plates 25 (refer to reference numeral 77), or when the upper end of the product curved resin hose 3 is located upwardly with respect to the upper end of the side verifying plate 25 (refer to reference numeral 79), the product curved resin hose 3 is estimated to have a deformation beyond the acceptable range.

As stated above, with use of the shape inspection device for the curved hose according to the present invention, it can be effectively prevented that a curved resin hose of improper shape is used, for example, for a piping system in a motor vehicle.

What is claimed is:

1. A shape inspection device for a curved resin hose having a hose body including a bent portion between one longitudinal end portion and the other longitudinal end portion of the curved resin hose, the shape inspection device, comprising:
   a first fixing portion for fixing said one longitudinal end portion of the curved resin hose;
   a second fixing portion for fixing the other longitudinal end portion of the curved resin hose, the second fixing portion being disposed so as to fix the other longitudinal end portion of the curved resin hose at a position where the other longitudinal end portion should be located when said one longitudinal end portion of the curved resin hose is fixed to the first fixing portion; and
   an inspecting portion provided between the first fixing portion and the second fixing portion;
   wherein the inspecting portion comprises an inspecting and verifying arrangement along a pathway through which the hose body of the curved resin hose should pass when said one longitudinal end portion and the other longitudinal end portion of the curved resin hose are fixed to the first and the second fixing portions, respectively, and the inspecting and verifying arrangement comprises verifying members disposed outside the pathway for the hose body and spaced from the pathway of the hose body;
   wherein the verifying members comprise lower verifying members under the pathway for the hose body, and side verifying members at widthwise opposite sides of the pathway, the lower verifying members being continuously disposed throughout an entire length or a generally entire length of the pathway, and spaced from the pathway, and the side verifying members being disposed at a plurality of positions along a length of the pathway, and spaced from the pathway, respectively.

2. The shape inspection device as set forth in claim 1, wherein said one longitudinal end portion and the other longitudinal end portion of the curved resin hose are fixed to the first and the second fixing portions, respectively, to check whether the hose body contacts the verifying member, and the curved resin hose is found not to have a shape as designed when the hose body contacts the verifying member.

3. The shape inspection device as set forth in claim 1, wherein the side verifying members are disposed corresponding to a straight portion or straight-line portion of the pathway.

4. The shape inspection device as set forth in claim 1, wherein the lower verifying member disposed at a position of a middle portion of the hose body includes an upper end surface that is angled in a widthwise direction of the hose body.

5. The shape inspection device as set forth in claim 1, wherein the side verifying members are transparent.

6. A shape inspection device for a curved resin hose having a hose body including a bent portion between one longitudinal end portion and the other longitudinal end portion of the curved resin hose, the shape inspection device, comprising:
   a first fixing portion for fixing said one longitudinal end portion of the curved resin hose;
   a second fixing portion for fixing the other longitudinal end portion of the curved resin hose, the second fixing portion being disposed so as to fix the other longitudinal end portion of the curved resin hose at a position where the other longitudinal end portion should be located when said one longitudinal end portion of the curved resin hose is fixed to the first fixing portion; and
   an inspecting portion provided between the first fixing portion and the second fixing portion;
   wherein the inspecting portion comprises an inspecting and verifying arrangement along a standard central line of the hose body when said one longitudinal end portion and the other longitudinal end portion of the curved resin hose are fixed to the first and the second fixing portions, respectively, the inspecting and verifying arrangement has verifying members, and the verifying members are spaced from the standard central line by a distance larger than a radius of the curved resin hose;
   wherein the verifying members comprise lower verifying members under the pathway for the hose body, and side verifying members at widthwise opposite sides of the pathway, the lower verifying members being continuously disposed throughout an entire length or a generally entire length of the pathway, and spaced from the standard central line by a distance larger than a radius of the hose body, and the side verifying members being disposed at a plurality of positions along a length of the pathway, and spaced from the central line by the distance larger than the radius of the hose body, respectively.

* * * * *